(12) United States Patent
Kim et al.

(10) Patent No.: US 12,557,005 B2
(45) Date of Patent: Feb. 17, 2026

(54) ELECTRONIC DEVICE, SYSTEM AND OPERATION METHOD OF THEREOF

(71) Applicant: Samsung Electronics Co., Ltd., Suwon-si (KR)

(72) Inventors: Namjin Kim, Suwon-si (KR); Seokhyun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 439 days.

(21) Appl. No.: 17/734,545

(22) Filed: May 2, 2022

(65) Prior Publication Data

US 2022/0361094 A1 Nov. 10, 2022

Related U.S. Application Data

(63) Continuation of application No. PCT/KR2022/005666, filed on Apr. 20, 2022.

(30) Foreign Application Priority Data

May 10, 2021 (KR) .................. 10-2021-0059900

(51) Int. Cl.
*H04W 48/16* (2009.01)
*H04W 4/021* (2018.01)
*H04W 60/00* (2009.01)

(52) U.S. Cl.
CPC ........... *H04W 48/16* (2013.01); *H04W 4/021* (2013.01); *H04W 60/00* (2013.01)

(58) Field of Classification Search
CPC ..... H04W 48/16; H04W 4/021; H04W 60/00; H04W 4/70; H04W 24/04; H04W 60/04;
(Continued)

(56) References Cited

U.S. PATENT DOCUMENTS 10,908,568 B2 * 2/2021 Jeong .................. H04L 12/2818
11,399,285 B2 7/2022 Smith et al.
(Continued)

FOREIGN PATENT DOCUMENTS

CN 111565137 A 8/2020
EP 3 905 786 A1 11/2021
(Continued)

OTHER PUBLICATIONS

US 11,423,876 B2, 08/2022, Kwon et al. (withdrawn)
(Continued)

*Primary Examiner* — Don N Vo
(74) *Attorney, Agent, or Firm* — Jefferson IP Law, LLP

(57) ABSTRACT

An electronic device is provided. The electronic device includes a communication module, a position sensor, and a processor. The processor is configured to obtain information of an external electronic device including status information of the external electronic device, position information of the external electronic device, and network information related to the external electronic device from a server through the communication module, check whether the external electronic device is in an offline state, based on the information, check whether the electronic device enters within a designated area at a position of the external electronic device, based on the position information of the electronic device obtained from the position sensor, in response to the external electronic device being in the offline state, scan a network through the communication module to check the network information in response to the electronic device being positioned in the designated area, and transmit the network information to the external electronic device in response to the network being different from the network information related to the external electronic device.

17 Claims, 9 Drawing Sheets

(58) Field of Classification Search
CPC ......... H04L 67/75; H04L 12/28; H04L 41/00;
H04L 41/0668; H04L 41/0686; H04L
41/0816; H04L 65/40; H04L 67/12; H04L
67/145; H04L 12/2807
USPC ........................................................ 455/434
See application file for complete search history.

(56) References Cited

U.S. PATENT DOCUMENTS

| | | | |
|---|---|---|---|
| 11,540,245 | B2 | 12/2022 | Lee |
| 2014/0369232 | A1 | 12/2014 | Kim et al. |
| 2015/0312857 | A1* | 10/2015 | Kim .................. H04W 52/0222 370/311 |
| 2016/0242033 | A1* | 8/2016 | Jung .................. H04W 12/069 |
| 2017/0120906 | A1 | 5/2017 | Penilla et al. |
| 2017/0272398 | A1* | 9/2017 | Cho ........................ H04L 67/75 |
| 2018/0321991 | A1* | 11/2018 | Kim ....................... H04W 84/18 |
| 2019/0182627 | A1 | 6/2019 | Thoresen et al. |
| 2019/0215182 | A1* | 7/2019 | Lee ..................... H04L 12/2825 |
| 2019/0342727 | A1* | 11/2019 | Park ........................ G10L 17/24 |
| 2020/0170054 | A1 | 5/2020 | Lee |
| 2020/0221293 | A1 | 7/2020 | Kim et al. |
| 2020/0267658 | A1* | 8/2020 | Cha .................. H04W 52/0261 |
| 2021/0068194 | A1 | 3/2021 | Han et al. |
| 2022/0086735 | A1 | 3/2022 | Zhang |

FOREIGN PATENT DOCUMENTS

| | | |
|---|---|---|
| KR | 10-1063538 B1 | 9/2011 |
| KR | 10-2013-0097303 A | 9/2013 |
| KR | 10-2014-0144880 A | 12/2014 |
| KR | 10-2019-0084584 A | 7/2019 |
| KR | 10-2020-0061210 A | 6/2020 |
| WO | 2019/113418 A1 | 6/2019 |
| WO | 2020/151385 A1 | 7/2020 |

OTHER PUBLICATIONS

International Search Report and Written Opinion dated Jul. 22, 2022, issued in International Patent Application No. PCT/KR2022/005666.
European Search Report dated Jun. 27, 2024, issued in European Application No. 22807637.8.
Korean Office Action dated Nov. 12, 2025, issued in Korean Application No. 10-2021-0059900.

* cited by examiner

ELECTRONIC DEVICE, SYSTEM AND OPERATION METHOD OF THEREOF

CROSS-REFERENCE TO RELATED APPLICATION(S)

This application is a continuation application, claiming priority under § 365(c), of an International application No. PCT/KR2022/005666, filed on Apr. 20, 2022, which is based on and claims the benefit of a Korean patent application number 10-2021-0059900, filed on May 10, 2021, in the Korean Intellectual Property Office, the disclosure of which is incorporated by reference herein in its entirety.

TECHNICAL FIELD

The disclosure relates to an electronic device, a system, and an operation method thereof. More particularly, the disclosure relates to an electronic device, a system, and an operation method thereof, such that when a network is changed, an external electronic device is reconnected to a server.

BACKGROUND ART

Internet of things (IoT) refer to devices having functions for transmitting/receiving information through networks such that information can be transmitted/received through the networks. IoT has recently been also applied to home appliances (for example, refrigerators, washing machines, dishwashers) such that smart refrigerators, smart washing machines, and smart dishwashers are widely used.

In general, such IoT devices may be connected to a server (for example, SmartThings cloud) and controlled in an IoT environment in which a user identifies the status of the devices through a terminal application (for example, SmartThings app) and deliver commands to the IoT devices.

Specifically, IoT devices may be connected to a server (or cloud) by being hub-connected through a network (for example, ZigBee, Zwave, local area network (LAN)), direct-connected through a network (for example, wireless fidelity (Wi-Fi)), or a device registered in a third-party could may be cloud-connected in a cloud-to-cloud type.

IoT devices direct-connected to a server through Wi-Fi, among the same, may be disconnected from the server if the wireless network router is powered off, if the service set Identifier (SSID) is changed due to a Wi-Fi change, or if the Wi-Fi password is changed.

If an IoT device is disconnected due to such a Wi-Fi connection problem, the user may be provided with no separate guide. In addition, the user may have to reperform, from the beginning, the processes of deleting the disconnected IoT device from the application and registering the device on the server.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

Aspects of the disclosure are to address at least the above-mentioned problems and/or disadvantages and to provide at least the advantages described below. Accordingly, an aspect of the disclosure is to provide an electronic device, a system, and an operation method thereof, such that when a network is changed, an external electronic device is reconnected to a server. Various embodiments disclosed herein may implement a technology where, in response to a change of a network to which an IoT device is connected in an IoT environment, the IoT device can be connected to a server through the changed network.

Another aspect of the disclosure is to provide an electronic device according to various embodiments, if an IoT device is direct-connected to a server through a network, and if the connected network is changed, the user may be provided with an alarm regarding the changed network, and the IoT device may be connected to the server through the changed network.

Another aspect of the disclosure is to provide an electronic device connecting an IoT device that provides an IoT (internet of things) function to a network (for example, Wi-Fi) and may register the same on a server (for example, smartThings cloud) together with network information. The electronic device may acquire the list of devices registered on the server through an application (for example, smartThings App), and may identify the status of the network to which each device is connected. In response to a device turned offline due to a network change, the electronic device may provide an alarm regarding the network changed through the application. In response to receiving a network update request input following the alarm, the electronic device may provide information regarding the changed network to the IoT device, thereby controlling the IoT device so as to connect to the changed network and to re-access the server.

Technical problems to be solved herein are not limited to the above-mentioned technical problems, and other technical problems not mentioned herein will be clearly understood from the following description by those skilled in the art to which the disclosure pertains.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a communication module, a position sensor, and a processor. The processor is configured to obtain information of an external electronic device including status information of the external electronic device, position information of the external electronic device, and network information related to the external electronic device from a server through the communication module, check whether the external electronic device is in an offline state, based on the information, check whether the electronic device enters within a designated area at a position of the external electronic device, based on the position information of the electronic device obtained from the position sensor, in response to the external electronic device being in the offline state, scan a network through the communication module to check the network information in response to the electronic device being positioned in the designated area, and transmit the network information to the external electronic device in response to the network being different from the network information related to the external electronic device.

In accordance with another aspect of the disclosure, a system is provided. The system includes an external electronic device, an electronic device, a network, and a server. The electronic device is configured to receive a notification from the server that the external electronic device is in an offline state, scan the network to obtain information related to the network, obtain information related to the external electronic device by scanning the external electronic device, and transmit the information related to the network to the external electronic device. The external electronic device is connected to the network, based on the information related to the network, and connected to the server through the network.

Advantageous Effects of Invention

For example, when registering an IoT device on a server, an electronic device may provide information regarding the network to which the IoT device is connected such that a problem regarding the connectivity of the IoT device can be recognized.

For example, in response to an IoT device being taken off line due to a network-related problem, an electronic device may provide an alarm indicating that the network has a problem.

For example, in response to a network change in an IoT environment, an electronic device may provide the user with an alarm regarding the network change.

For example, in response to an IoT device being taken off line due to a network-related problem, an electronic device may provide the IoT device with information regarding a connectable network.

For example, an electronic device may update, to an IoT device, information regarding a changed network in an IoT environment.

For example, a technology may be provided such that an electronic device transmits changed network information to an IoT device, which then access a server through the changed network without a separate registration process.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

BEST MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
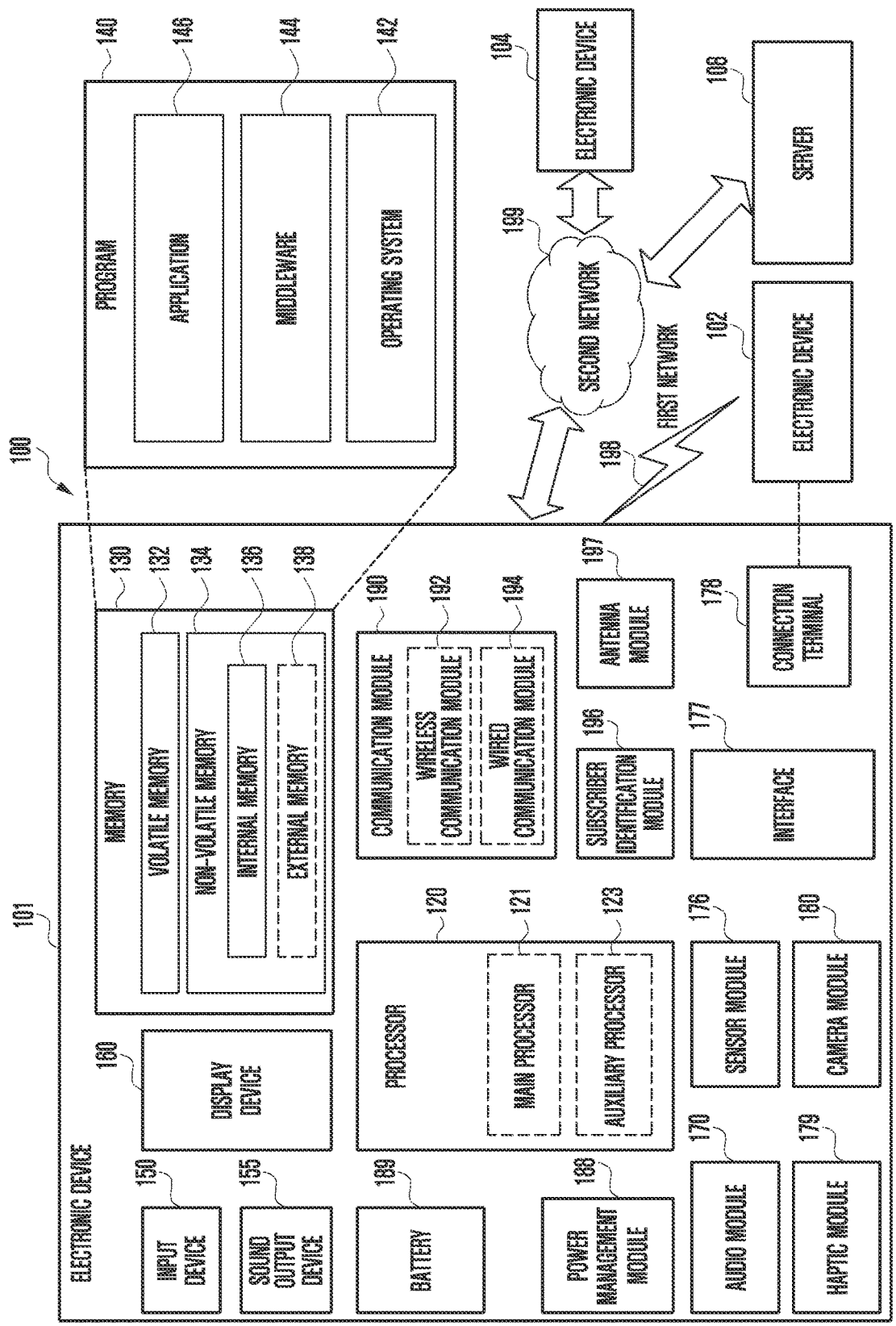
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
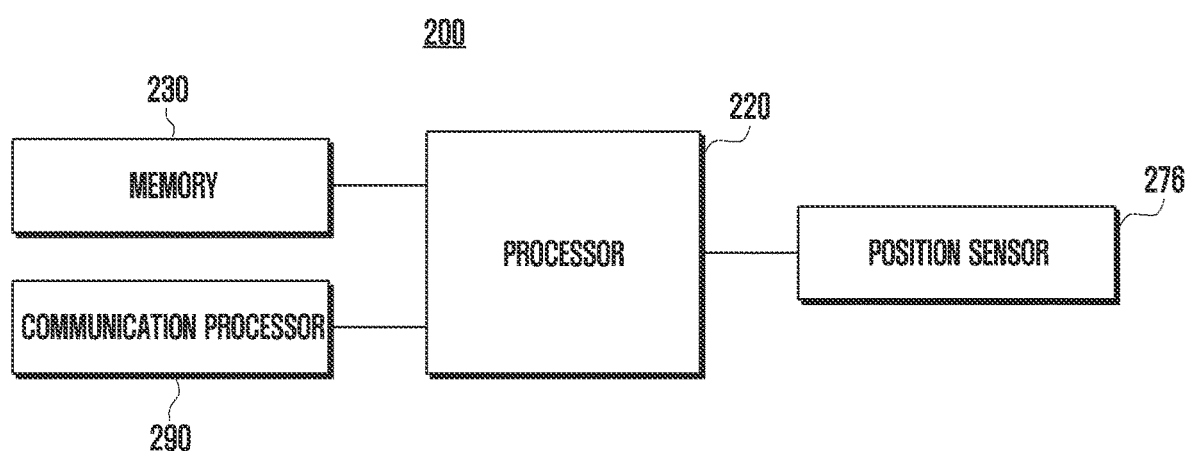
FIG. 2 is a block diagram illustrating an electronic device according to an embodiment of the disclosure.

FIG. 2 is a block diagram illustrating an electronic device according to an embodiment of the disclosure.

Referring to FIG. 2, the electronic device 200 (e.g., the electronic device 101 of FIG. 1) may include a processor 220 (e.g., the processor 120 of FIG. 1), a memory 230 (e.g., the memory 130 of FIG. 1), a display (e.g., the display 160 of FIG. 1), a position sensor 276 (e.g., the sensor module 176 of FIG. 1), and/or a communication module 290 (e.g., the communication module 190 of FIG. 1). The components included in FIG. 2 are for some of the components included in the electronic device 200, and the electronic device 200 may include various other components as shown in FIG. 1.

The communication module 290 (e.g., the communication module 190 of FIG. 1) according to various embodiments may communicate with an external electronic device (e.g., an external electronic device 310 of FIG. 3) and/or a server (e.g., a server 330 of FIG. 3) to receive and/or transmit various information through a network (e.g., the first network 198 and/or the second network 199 of FIG. 1). For example, the communication module 290 may communicate with the server 330 through a network (e.g., Wi-Fi, a legacy cellular network, a 5G network, a next-generation communication network, and/or the Internet) to receive and/or transmit various information. For example, the communication module 290 may communicate with the external electronic device 310 through a short-range wireless communication network (e.g., Bluetooth, Bluetooth Low Energy (BLE), Near-Field Communication (NFC)) and/or SoftAP (or Wi-Fi Direct) to receive and/or transmit various information.

According to an embodiment, the communication module 290 may receive information related to the external electronic device 310 (e.g., identification information, model information, position information, and/or network information) from the external electronic device 310. For example, the communication module 290 may transmit network-related information (e.g., network identification information and/or password) to the external electronic device 310.

The processor 220 according to an embodiment may be connected to the communication module 290 to process various information received by the communication module 290 from an external electronic device and/or a server. In addition, the processor 220 may control the communication module 290 to transmit various information to an external electronic device and/or a server.

The position sensor 276 according to various embodiments may measure a geographic position of the electronic device 200. For example, the position sensor 276 may include a GNSS (e.g., a global positioning system (GPS) and/or a global navigation satellite system (GLONASS)) and/or a Wi-Fi positioning system (WPS). For example, the GNSS may be a system for measuring a current position based on radio waves emitted from a plurality of satellites using a GPS sensor and/or a GLONASS sensor. The WPS may be a system for measuring an indoor location using wireless access point (AP) information recognized as Wi-Fi. The processor 220 according to an embodiment may be connected to the position sensor 276 to request to measure the position of the electronic device 200, and the position sensor 276 may provide the measured position information of the electronic device 200 to the processor 220.

The memory 230 according to various embodiments may temporarily and/or non-temporarily store various types of information. The memory 230 according to an embodiment may temporarily and/or non-temporarily store information related to the external electronic device 310 and/or information related to a network. For example, the memory 230 may store information related to the external electronic device 310 including identification information, model information of the external electronic device 310, and/or information (e.g., service set identifier (SSID), basic service set identifier (BSSID), received signal strength identification (RSSI)) related to a network to which the external electronic device 310 is connectable. For example, the memory 230 may store network-related information including service set identifier (SSID), basic service set identifier (BSSID), and network passwords (password, passphrase).

The processor 220 according to an embodiment may store various information in the memory 230 and/or obtain it from the memory 230.

Figure 3:
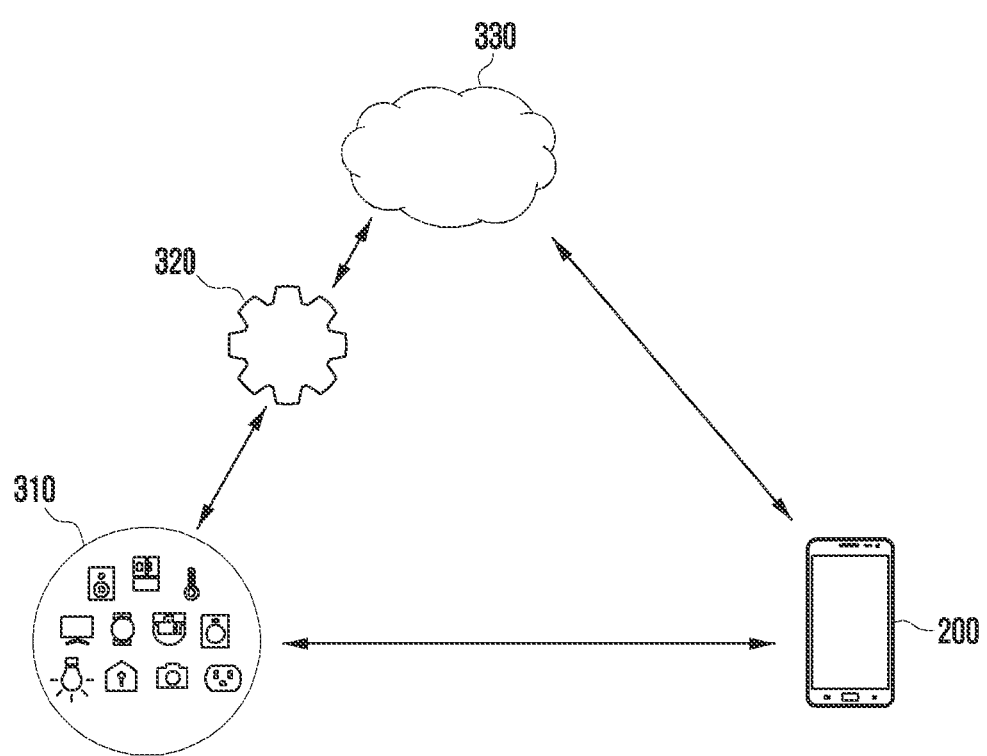
FIG. 3 is a diagram illustrating a system according to an embodiment of the disclosure.

FIG. 3 is a diagram illustrating a system according to an embodiment of the disclosure.

The system according to various embodiments may be a network environment supporting the Internet of Things (IoT). Each component may be one entity or a set of multiple entities.

Referring to FIG. 3, the system may include an electronic device 200, an external electronic device 310, a network 320, and/or a server 330.

The electronic device 200 according to various embodiments may be the electronic device described with reference to FIG. 2.

The external electronic device 310 according to various embodiments may be an Internet of things (IoT) device.

According to an embodiment, the external electronic device 310 may be an electronic device that communicates through a network (e.g., Wi-Fi, legacy cellular networks, 5G networks, next-generation communication networks, the Internet, Bluetooth, Bluetooth Low Energy (BLE), Near-Field Communication (NFC)) and/or SoftAP (or Wi-Fi Direct). For example, the external electronic device 310 may include a home appliance (e.g., a smart air conditioner, a smart refrigerator, a smart dishwasher, and/or a smart speaker) that performs a communication function through a network.

According to an embodiment, the external electronic device 310 may include a communication module. For example, the external electronic device 310 may receive and/or transmit various information by communicating with the electronic device 200 and/or the server 330 through the communication module.

According to an embodiment, the external electronic device 310 may communicate with the server 330 using a network (e.g., Wi-Fi, a legacy cellular network, a 5G network, a next-generation communication network, and/or the Internet) through a communication module. For example, the external electronic device 310 may be connected to the server 330 through the network 320.

According to an embodiment, the external electronic device 310 may communicate with the electronic device 200 through a communication module using a wireless local area network (e.g., Bluetooth, Bluetooth Low Energy (BLE), Near-Field Communication (NFC) and/or SoftAP (or Wi-Fi Direct)).

The network 320 according to various embodiments may be a wireless network (WLAN, e.g., Wi-Fi network) provided by a wireless access point (e.g., Wi-Fi access point (AP)). The network 320 according to an embodiment may provide an environment in which the external electronic device 310 can communicate with the server 330.

The server 330 according to various embodiments may include a cloud server, an account server, a service server, and/or a web server. For example, the server 330 may be a cloud server (e.g., an IoT cloud server) related to an IoT device. For example, the server 330 may be a cloud server related to an application controlling the external electronic device 310. For example, the plurality of external electronic devices 310 may be respectively connected to the server 330. For example, all processing processes (or data flows) related to the control operation of the external electronic devices 310 may be operated as a centralized control system controlled by the server 330.

The server 330 according to an embodiment may store information related to the external electronic device 310. For example, the server 330 may store identification information (e.g., serial code) of the external electronic device 310, model information (e.g., model code), position information, and network information (e.g., service set identifier (SSID), basic service set identifier (BSSID), received signal strength identification (RSSI), Information related to encryption such as capability authentication method (e.g., WPA/WPA2-PSK/AES)) related to the external electronic device 310.

For example, the identification information (serial code) of the external electronic device 310 may be information uniquely assigned to each external electronic device 310. For example, the model information (model code) of the external electronic device 310 may be information related to a model type according to the type and version of the external electronic device 310. For example, the network information related to the external electronic device 310 may be information related to a network (e.g., Wi-Fi) to which the external electronic device 310 is connected, in a method in which the external electronic device 310 is directly connected to the server 330.

Figure 4:
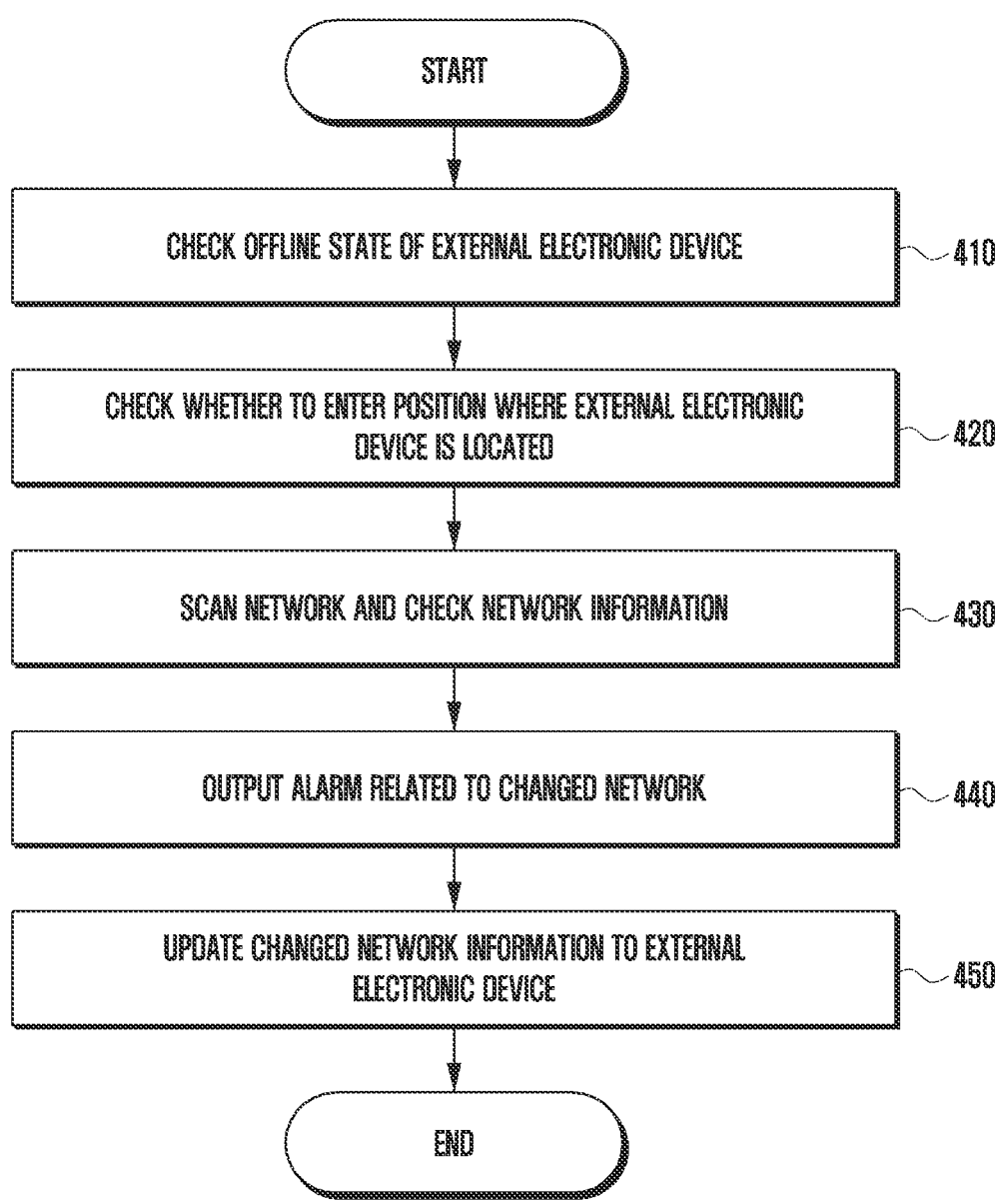
FIG. 4 is a flowchart illustrating a method in which a processor controls an electronic device to update changed network information to an external electronic device, according to an embodiment of the disclosure.

FIG. 4 is a flowchart illustrating a method in which a processor (e.g., the processor 220 of FIG. 2) controls an electronic device (e.g., the electronic device 200 of FIG. 2) to update the changed network (e.g., the network 320 of FIG. 3) information to an external electronic device (e.g., the external electronic device 310 of FIG. 3) according to an embodiment of the disclosure.

Referring to FIG. 4, according to various embodiments, the processor 220 may check the offline state of the external electronic device 310 in operation 410.

According to an embodiment, the processor 220 may obtain information indicating that the external electronic device 310 is in an off-line state from a server (e.g., the server 330 of FIG. 3). For example, the offline state of the external electronic device 310 may be a state in which the connection between the external electronic device 310 and the server 330 is released, so that transmission and reception of information between the external electronic device 310 and the server 330 is impossible.

For example, the processor 220 may obtain information that the external electronic device 310 is in an offline state from the server 330 through an application related to the control of the external electronic device 310. For example, the server 330 may obtain information related to the external electronic device 310 registered in the application. For example, the information related to the external electronic device 310 may include a network connection state with the external electronic device 310. For example, the server 330 may transmit information that the external electronic device 310 is offline to the processor 220 through the application in response to no network connection with the external electronic device 310. For example, the server 330 may transmit information indicating that the external electronic device 310 is offline to the processor 220 through an application in response to the failure to obtain a signal from the external electronic device 310.

According to various embodiments, in operation 420, the processor 220 may check that the electronic device 200 enters the area in which the external electronic device 310 is located.

According to an embodiment, the processor 220 may obtain position information of the electronic device 200 through the position sensor 276. For example, the position sensor 276 may include GNSS (e.g., global positioning system (GPS) and/or global navigation satellite system (GLONASS)) and/or Wi-Fi positioning system (WPS). For example, the GNSS may be a system for measuring a current position based on radio waves emitted from a plurality of satellites using a GPS sensor and/or a GLONASS sensor. The WPS may be a system for measuring an indoor position using wireless access point (AP) information recognized as Wi-Fi. The processor 220 according to an embodiment may be connected to the position sensor 276 to request to measure the position of the electronic device 200, and the position sensor 276 may provide the measured position information of the electronic device 200 to the processor 220.

According to an embodiment, the processor 220 may obtain position information of the external electronic device 310 from the server 330. For example, the server 330 may store the information related to the external electronic device 310 including position information of the external electronic device 310.

According to an embodiment, the processor 220 may obtain position information of the external electronic device 310 stored in the memory 230. For example, the memory 230 may store information related to the external electronic device 310 including position information of the external electronic device 310.

According to an embodiment, the processor 220 may check that the electronic device 200 is located within a designated area from the position of the external electronic device 310, based on the position information of the external electronic device 310 obtained from the server 330 and/or the memory 230 and the position information of the electronic device 200 obtained from the position sensor 276.

According to various embodiments of the disclosure, in operation 430, the processor 220 may scan a network to check network information.

According to an embodiment, the processor 220 may scan the network 320 through the communication module 290, in response to confirming that the electronic device 200 is located within a designated area from the position of the external electronic device 310. For example, the processor 220 may check a connectable network 320 in a designated area.

According to an embodiment, the processor 220 may check network information. For example, the processor 220 may check network information including service set identification information (e.g., service set identifier (SSID), basic service set identifier (BSSID)) and/or a network password (password, passphrase) of the connectable network 320.

According to an embodiment, the network information may be information stored in the memory 230. For example, the network information may be information related to the network 320 to which the electronic device 200 has a connection history, and the processor 220 may store network information including a network SSID and/or password having a connection history in the memory 230.

According to an embodiment, the processor 220 may check network information related to the external electronic device 310 obtained from the server 330 and/or the memory 230. For example, the network information related to the external electronic device 310 may be information related to the network 320 used when the external electronic device 310 is connected to the server 330.

According to an embodiment, the processor 220 may check whether network information related to the external electronic device 310 exists among the network information of the networks 320 scanned through the communication module 290. For example, the processor 220 may check whether identification information of a network related to the external electronic device 310 exists among the identification information of the networks 320 scanned through the communication module 290.

According to an embodiment, the processor 220 may output an alarm indicating that a problem has occurred in the external electronic device 310, in response to the presence of network information related to the external electronic device 310 among the network information of the scanned networks 320.

According to various embodiments, the processor 220 may output an alarm related to the changed network in operation 440.

According to an embodiment, the processor 220 may determine that the network 320 has changed, in response to the absence of network information related to the external electronic device 310 among the network information of the scanned networks 320.

According to an embodiment, in response to determining that the network 320 has changed, the processor 220 may output a user interface (UI) according to an alarm related to the changed network 320. For example, in response to determining that the network has been changed, the processor 220 may output an alarm from an application related to the control of the external electronic device 310. A specific example related to operation 440 will be described later in the description related to FIGS. 8A and 8B.

According to various embodiments, in operation 450, the processor 220 may update information related to the changed network 320 to the external electronic device 310.

According to an embodiment, in response to obtaining a user's network information update request input through a UI (user interface) according to an alarm related to a changed network, the processor 220 may update information related to the changed network 320 to the external electronic device 310.

According to another embodiment, in response to determining that the network 320 has changed, the processor 220 may update information related to the changed network 320 to the external electronic device 310.

According to various embodiments, the processor 220 may control the external electronic device 310 so that the external electronic device 310 can be connected to the server 330 through the changed network 320. According to an embodiment, the processor 220 may determine whether to perform an operation for controlling the external electronic device 310 to be registered with the server 330 through the changed network 320 or perform an operation for controlling the external electronic device 310 to connect to the changed network 320, according to the range of functions that the external electronic device 310 can perform, based on information related to the external electronic device 310 (e.g., model information).

According to an embodiment, the processor 220 may control the external electronic device 310 to register the external electronic device 310 with the server 330 through the changed network 320. For example, the processor 220 may obtain information related to the external electronic device 310 including information for registering the external electronic device 310 from the server 330, based on the information of the external electronic device 310 (e.g., the model code of the external electronic device). For example, the processor 220 may output a registration screen of the external electronic device 310 on the display, based on information for registering the external electronic device 310. In response to obtaining a request related to registration of the external electronic device 310, the processor 220 may obtain information on the external electronic device 310 by connecting to the external electronic device 310 via a wireless local area network (e.g., Bluetooth, Bluetooth Low Energy (BLE), Near-Field Communication (NFC) and/or SoftAP (or Wi-Fi Direct)). For example, in response to the information related to the external electronic device obtained from the server 330 and the information of the connected external electronic device 310 match, the processor 220 may transmit information related to the network 320 (e.g., Wi-Fi SSID and password) to the external electronic device 310. For example, the processor 220 may output an alarm requesting device confirmation to the user in response to a discrepancy between the information related to the external electronic device obtained from the server 330 and the information of the connected external electronic device 310. According to an embodiment, the external electronic device 310 may connect to the network 320 and register it with the server 330 based on the received network information. A detailed description related to the operation of the external electronic device 310 registering with the server 330 will be described later in the description related to FIG. 7.

According to another embodiment, the processor 220 may control the external electronic device 310 so that the external electronic device 310 is connected to the changed network 320. For example, the processor 220 may obtain information related to the external electronic device 310 including information for establishing a connection network of the external electronic device 310 from the server 330, based on the information of the external electronic device 310 (e.g., the model code of the external electronic device). The processor 220 may switch to the external electronic device 310 setting screen based on information for setting the connection network of the external electronic device 310. In response to obtaining a request related to registration of the external electronic device 310, the processor 220 may be connected to the external electronic device 310 via a short-range wireless communication network (e.g., Bluetooth, Bluetooth Low Energy (BLE), Near-Field Communication (NFC) and/or SoftAP (or Wi-Fi Direct)). In response to the information related to the external electronic device obtained from the server 330 and the information of the connected external electronic device 310 match, the processor 220 may transmit network information (e.g., Wi-Fi SSID and/or password) to the external electronic device 310. The external electronic device 310 may connect to the network 320 based on the received network information. According to an embodiment, the external electronic device 310 may access the server 330 through the network 320. For example, the external electronic device 310 may be connected to the server 330 to obtain various information including a control command from the server 330.

Figure 5:
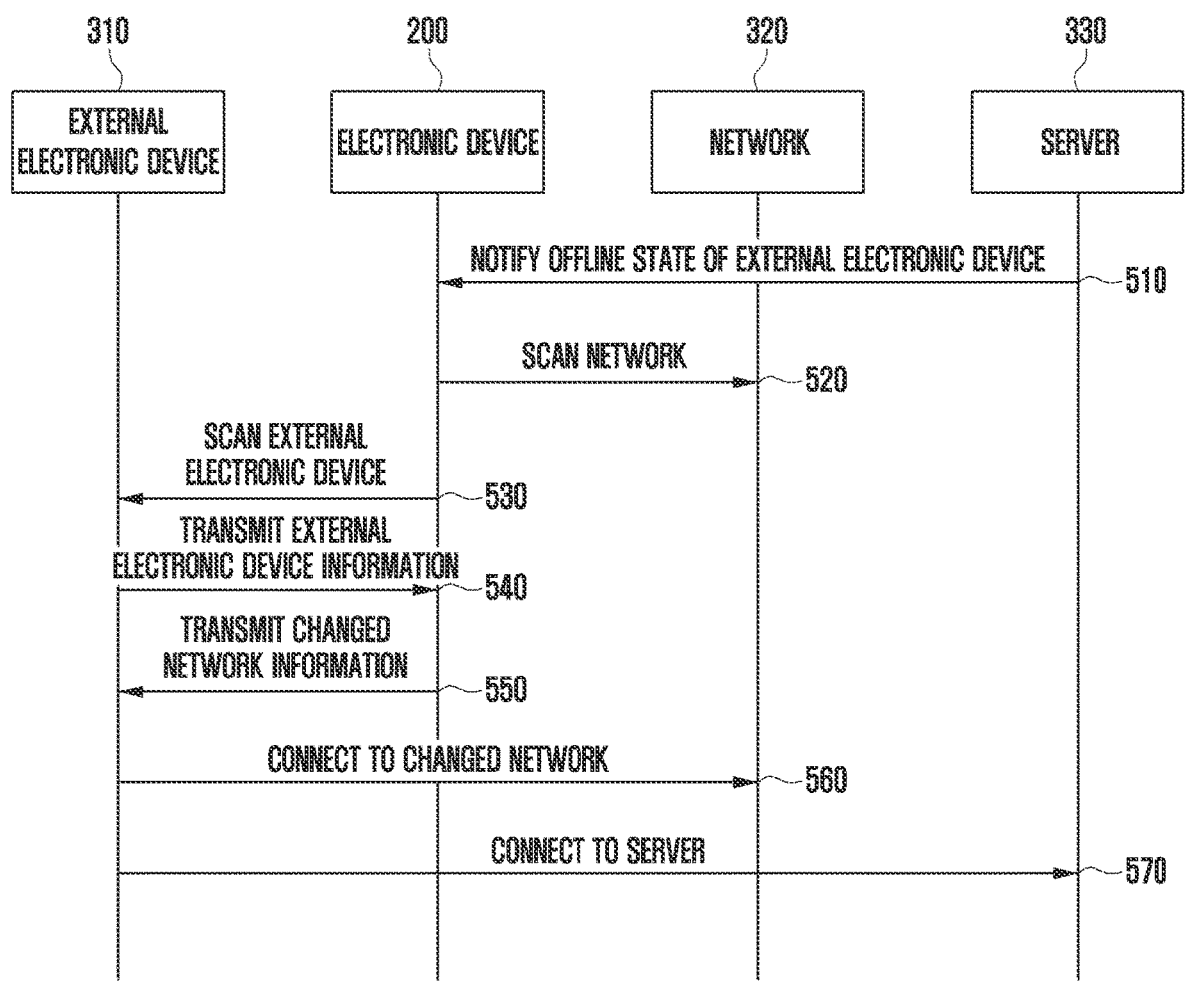
FIG. 5 is a flowchart illustrating a method in which a system registers an external electronic device with a server through a changed network according to an embodiment of the disclosure.

FIG. 5 is a flowchart illustrating a method in which a system registers an external electronic device with a server through a changed network according to an embodiment of the disclosure.

Referring to FIG. 5, according to various embodiments, in operation 510, the server 330 may transmit information notifying that the external electronic device 310 is in an offline state to the electronic device 200. For example, the offline state of the external electronic device 310 may be a state in which the connection between the external electronic device 310 and the server 330 is released, so that transmission and reception of information between the external electronic device 310 and the server 330 is impossible.

According to an embodiment, the server 330 may store information related to the external electronic device 310 registered in an application related to the control of the external electronic device 310. For example, the server 330 may store information related to the external electronic device 310 including a network connection state with the external electronic device 310.

According to an embodiment, in response to the failure to establish a network connection with the external electronic device 310, the server 330 may transmit information that the external electronic device 310 is offline to the electronic device 200 through the application. For example, in response to failure to obtain a signal from the external electronic device 310, the server 330 may transmit information indicating that the external electronic device 310 is offline to the processor 220 through an application.

According to various embodiments, the electronic device 200 may scan the network 320 in operation 520.

According to various embodiments, it may be confirmed that the electronic device 200 is located within a designated area from the position of the external electronic device 310. According to an embodiment, the electronic device 200 may acquire position information of the electronic device 200 through the position sensor 276. For example, the position sensor 276 may include a GNSS (e.g., a global positioning system (GPS) and/or a global navigation satellite system (GLONASS)) and/or a Wi-Fi positioning system (WPS). For example, the GNSS may be a system for measuring a current position based on radio waves emitted from a plurality of satellites using a GPS sensor and/or a GLONASS sensor. The WPS may be a system for measuring an indoor position using wireless access point (AP) information recognized as Wi-Fi. The processor 220 according to an embodiment may be connected to the position sensor 276 to request to measure the position of the electronic device 200, and the position sensor 276 may provide the measured position information of the electronic device 200 to the processor 220.

According to an embodiment, the electronic device 200 may check that the electronic device 200 is located within a designated area from the position of the external electronic device 310, based on the position information of the external electronic device 310 obtained from the server 330 and/or the memory 230 and the position information of the electronic device 200 obtained from the position sensor 276.

According to various embodiments, in response to confirming that the external electronic device 310 is located within a designated area from the position of the external electronic device 310, the electronic device 200 may scan the network 320. For example, the electronic device 200 may check a connectable network 320 in a designated area through a communication module (e.g., the communication module 290 of FIG. 2). For example, the electronic device 200 may check network 320 information including service set identifier (SSID), basic service set identifier (BSSID), and a network password (password, passphrase) of the connectable network 320.

According to an embodiment, the network information may be information stored in a memory (e.g., the memory 230 of FIG. 2) of the electronic device 200. For example, the network information may be information related to the network 320 to which the electronic device 200 has a connection history, and the electronic device 200 may store network information including a network SSID and/or password having a connection history in the memory 230.

According to an embodiment, the electronic device 200 may check network information related to the external electronic device 310 obtained from the server 330 and/or the memory 230. For example, the network information related to the external electronic device 310 may be information related to a network used when the external electronic device 310 is connected to the server 330.

According to an embodiment, the electronic device 200 may check whether network information related to the external electronic device 310 exists among the information of the networks 320 scanned through the communication module 290.

According to an embodiment, in response to that network information related to the external electronic device 310 does not exist among the scanned information of the networks 320, the processor 220 may determine that the network 320 has been changed.

According to various embodiments, the electronic device 200 may scan the external electronic device 310 in operation 530.

According to various embodiments, in response to determining that the network has changed, the electronic device 200 may be connected to the external electronic device 310 via the communication module 290 using a short-range wireless communication network (e.g., Bluetooth, Bluetooth Low Energy (BLE), Near-Field Communication (NFC) and/or SoftAP (or Wi-Fi Direct)).

According to an embodiment, the electronic device 200 may request the connected external electronic device 310 to transmit information related to the external electronic device 310.

According to various embodiments, in operation 540, the external electronic device 310 may transmit information on the external electronic device 310 to the electronic device 200.

For example, the external electronic device 310 may transmit information related to the external electronic device 310 including identification information, model information, and/or information related to a network to which the external electronic device 310 is connectable (e.g., service set identifier (SSID), basic service set identifier (BSSID)) of the external electronic device 310, and received signal strength identification (RSSI) to the electronic device 200.

According to various embodiments, in operation 550, the electronic device 200 may transmit information related to the changed network 320 to the external electronic device 310.

According to an embodiment, the electronic device 200 may transmit information related to the changed network 320 to the external electronic device 310 so that the external electronic device 310 is connected to the changed network 320.

According to an embodiment, in response that the information related to the external electronic device 310 obtained from the server 330 and the information related to the external electronic device 310 obtained in operation 540 match, the electronic device 200 may transmit information related to the network 320 (e.g., a Wi-Fi SSID and/or password) to the external electronic device 310. According to an embodiment, the electronic device 200 may transmit information related to a network connectable to the external electronic device 310 obtained in operation 540 from among the networks 320 scanned in operation 520 to the external electronic device 310.

According to various embodiments, the external electronic device 310 may connect to the changed network 320 in operation 560.

The external electronic device 310 may connect to the network 320 based on the information related to the network 320 obtained in operation 550.

According to various embodiments, the external electronic device 310 may connect to the server 330 in operation 570.

According to an embodiment, the external electronic device 310 may be connected to the server 330 through the network 320. For example, the external electronic device 310 may be connected to the server 330 to obtain various information including a control command from the server 330.

According to another embodiment, the external electronic device 310 may register with the server 330 through the network 320. The operation in which the external electronic device 310 registers with the server 330 may be described in detail in the description related to FIG. 7.

Figure 6:
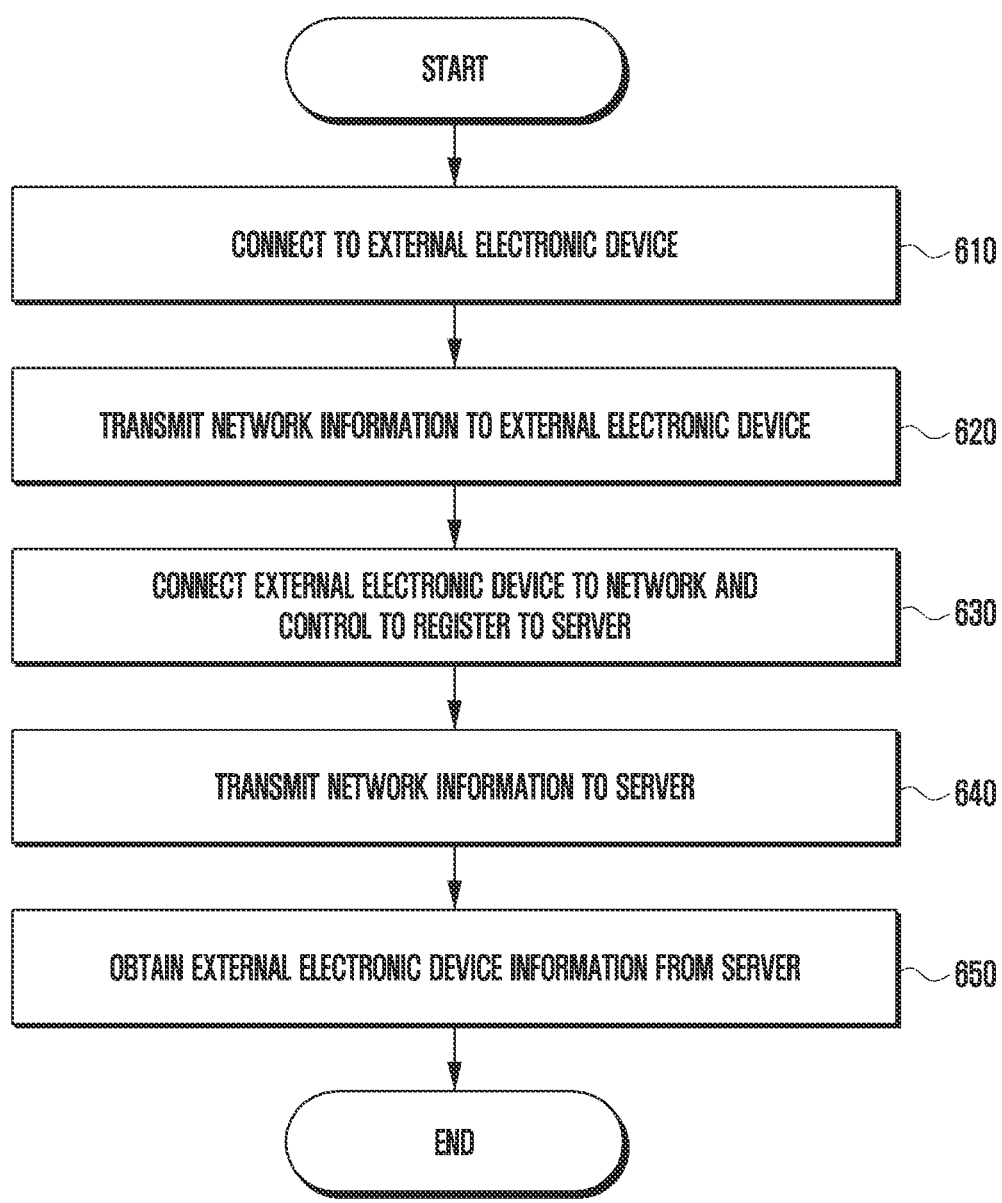
FIG. 6 is a diagram illustrating a method of a processor controlling an electronic device to register an external electronic device with a server according to an embodiment of the disclosure.

FIG. 6 is a diagram illustrating a method in which a processor (e.g., the processor 220 of FIG. 2) controls an electronic device (e.g., the electronic device 200 of FIG. 2) to register an external electronic device (E.G., the electronic device 310 of FIG. 3) with a server (e.g., the server 330 of FIG. 3) according to an embodiment of the disclosure.

Referring to FIG. 6, according to various embodiments, the processor 220 may connect with the external electronic device 310 in operation 610.

For example, in operation 610, the processor 220 may be connected to the external electronic device 310 using the communication module 290, through a short-range wireless communication network (e.g., Bluetooth, Bluetooth Low Energy (BLE), Near-Field Communication (NFC) and/or SoftAP (or Wi-Fi Direct)).

According to an embodiment, the processor 220 may obtain information related to the external electronic device 310 from the connected external electronic device 310. For example, the processor 220 may obtain information related to the external electronic device 310 including identification information, model information of the external electronic device 310, and/or information (e.g., service set identifier (SSID), basic service set identifier (BSSID), received signal strength identification (RSSI) related to a network to which the external electronic device 310 is connectable.

According to various embodiments, the processor 220 may transmit network information to the external electronic device 310 in operation 620.

According to an embodiment, the processor 220 may transmit network information to the external electronic device 310 through the communication module 290.

According to an embodiment, the processor 220 may transmit network information to the external electronic device 310 among the acquired information related to the external electronic device 310, based on information related to a network connectable to the external electronic device 310. For example, the network information may be information stored in the memory 230. For example, the network information is information related to a network having a connection history to which the electronic device 200 is connected, and the processor 220 may store a network SSID and/or password having a connection history in the memory 230. The processor 220 may transmit network information including an SSID and/or password of a network connectable to the external electronic device 310 to the external electronic device 310.

According to various embodiments, in operation 630, the processor 220 may control the external electronic device 310 to connect the external electronic device 310 to the network 320 and register the external electronic device 310 with the server 330.

According to an embodiment, the processor 220 may control the external electronic device 310 to connect to the network 320, based on the network information obtained by the external electronic device 310. For example, the external electronic device 310 may register with the server 330 through the network 320 connection. For example, the external electronic device 310 may transmit information of the external electronic device 310 including a serial code and/or a model code to the server 330 through a network 320 connection, and the server 330 may register the external electronic device 310 based on the acquired information of the external electronic device 310.

According to an embodiment, the server 330 may transmit a notification that the external electronic device 310 is registered to the processor 220 through an application that controls the external electronic device 310.

According to various embodiments, in operation 640, the processor 220 may transmit network 320 information to the server 330.

According to an embodiment, in response to receiving a notification that the external electronic device 310 is registered from the server 330, the processor 220 may transmit information (e.g., BSSID, SSID, RSSI, Capability) of a network connected to the external electronic device 310 to the server 330.

For example, the processor 220 may transmit information on the network 320 to which the external electronic device 310 is connected to the server 330, based on network information (e.g., service set identifier (SSID), basic service set identifier (BSSID), received signal strength identification (RSSI)) scanned by the external electronic device 310 acquired from the external electronic device 310 and network information (e.g., service set identifier (SSID), basic service set identifier (BSSID), network password (password, passphrase)) stored in the memory 230.

According to various embodiments, the processor 220 may obtain information on the external electronic device 310 from the server 330 in operation 650.

According to an embodiment, the processor 220 may obtain information on the external electronic device 310 from the server 330 through the communication module 290. For example, the processor 220 may acquire information on the external electronic device 310 including a serial code and/or a model code through an application related to the control of the external electronic device 310.

According to an embodiment, the processor 220 may store information of the external electronic device 310 in a memory.

Figure 7:
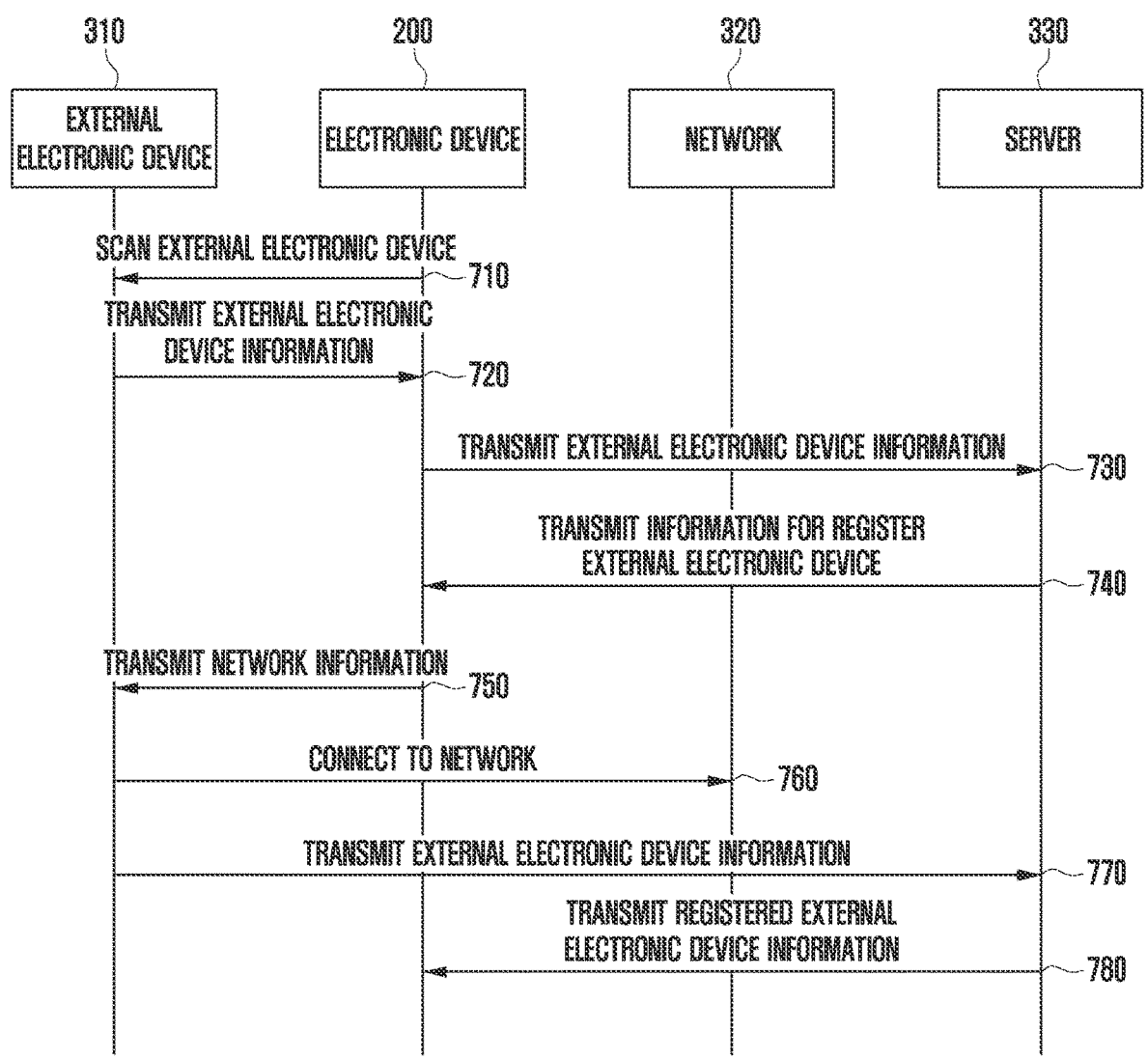
FIG. 7 is a flowchart illustrating a method in which a system registers an external electronic device with a server according to an embodiment of the disclosure.

FIG. 7 is a flowchart illustrating a method in which a system according to various embodiments registers an external electronic device (e.g., the external electronic device 310 of FIG. 3) with a server (e.g., the server 330 of FIG. 3) according to an embodiment of the disclosure.

Referring to FIG. 7, according to various embodiments, in operation 710, the electronic device 200 may scan the external electronic device 310.

For example, the electronic device 200 may be connected to the external electronic device 310 using the communication module 290, through a short-range wireless communication network (e.g., Bluetooth, Bluetooth Low Energy (BLE), Near-Field Communication (NFC) and/or SoftAP (or Wi-Fi Direct)).

According to various embodiments, in operation 720, the external electronic device 310 may transmit information related to the external electronic device 310 to the electronic device 200.

According to an embodiment, the processor 220 may obtain information related to the external electronic device 310 from the connected external electronic device 310. For example, the processor 220 may obtain information related to the external electronic device 310 including identification information, model information of the external electronic device 310, and/or information related to a network to which the external electronic device 310 is connectable (e.g., service set identifier (SSID), basic service set identifier (BSSID), received signal strength identification (RSSI)).

According to various embodiments, in operation 730, the electronic device 200 may transmit information related to the external electronic device 310 to the server 330.

According to an embodiment, the electronic device 200 may transmit information related to the external electronic device 310 obtained in operation 720 to the server 330.

According to various embodiments, in operation 740, the server 330 may transmit information for registering the external electronic device 310 to the electronic device 200.

According to an embodiment, the server 330 may transmit information for registering the external electronic device 310 including a registration guide for the external electronic device 310 to the electronic device 200, based on information related to the external electronic device 310.

According to an embodiment, the server 330 may store a registration guide for each type of external electronic device. For example, the server 330 may store a registration guide that can be provided to the user so that the external electronic device can be registered on the server 330 based on the model code of the external electronic device. For example, the registration guide may include content instructing the user to perform a specified operation with respect to the external electronic device and/or the electronic device 200 (e.g., Press the connect button on the refrigerator for more than 3 seconds).

According to an embodiment, the server 330 may transmit the registration guide corresponding to the model code of the external electronic device 310 obtained in operation 730 to the electronic device 200.

According to an embodiment, the electronic device 200 may output the registration screen of the external electronic device 310 to the display, based on the information for registering the external electronic device 310 obtained from the server 330.

According to various embodiments, in operation 750, the electronic device 200 may transmit information related to the network 320 to the external electronic device 310.

According to an embodiment, in response to obtaining a user's registration request input through a user interface (UI) of the external electronic device 310 registration screen, the electronic device 200 may transmit information related to the network 320 to the external electronic device 310.

According to an embodiment, the electronic device 200 may transmit network information to the external electronic device 310 among the acquired information related to the external electronic device 310, based on information related to a network to which the external electronic device 310 can connect. For example, the network information may be information stored in the memory of the electronic device 200 (e.g., the memory 230 of FIG. 2). For example, the network information may be information related to a network to which the electronic device 200 has a connection history, and the electronic device 200 may store a network SSID and/or password having a connection history in the memory 230. The electronic device 200 may transmit network information including an SSID and/or a password of a network connectable to the external electronic device 310 to the external electronic device 310.

According to various embodiments, in operation 760, the external electronic device 310 may connect to the network 320 based on the acquired network-related information.

According to an embodiment, the external electronic device 310 may connect to the network 320 based on the network SSID and/or password obtained in operation 750.

According to various embodiments, in operation 770, the external electronic device 310 may register with the server 330.

According to an embodiment, the external electronic device 310 may register the external electronic device 310 with the server 330 through the network 320 connection. For example, the external electronic device 310 may transmit information of the external electronic device 310 including a serial code and/or a model code to the server 330 through a network 320 connection, and the server 330 may register the external electronic device 310 based on the acquired information of the external electronic device 310.

According to various embodiments, when the registered external electronic device 310 is registered with the server 330 before operations 710 to 770, the external electronic device 310 may transmit information related to the external electronic device 310 (e.g., identification information, model information, position information, and/or network information) to the server 330.

According to various embodiments, in operation 780, the server 330 may transmit information related to the external electronic device 310 registered in the electronic device 200.

For example, the server 330 may transmit a notification that the external electronic device 310 is registered to the electronic device 200 and information related to the external electronic device 310 through an application related to the control of the external electronic device 310.

According to various embodiments, when the registered external electronic device 310 is registered with the server 330 before operations 710 to 770, the external electronic device 310 may transmit information related to the external electronic device 310 (e.g., identification information, model information, position information, and/or network information) to the electronic device 200.

Figure 8A:
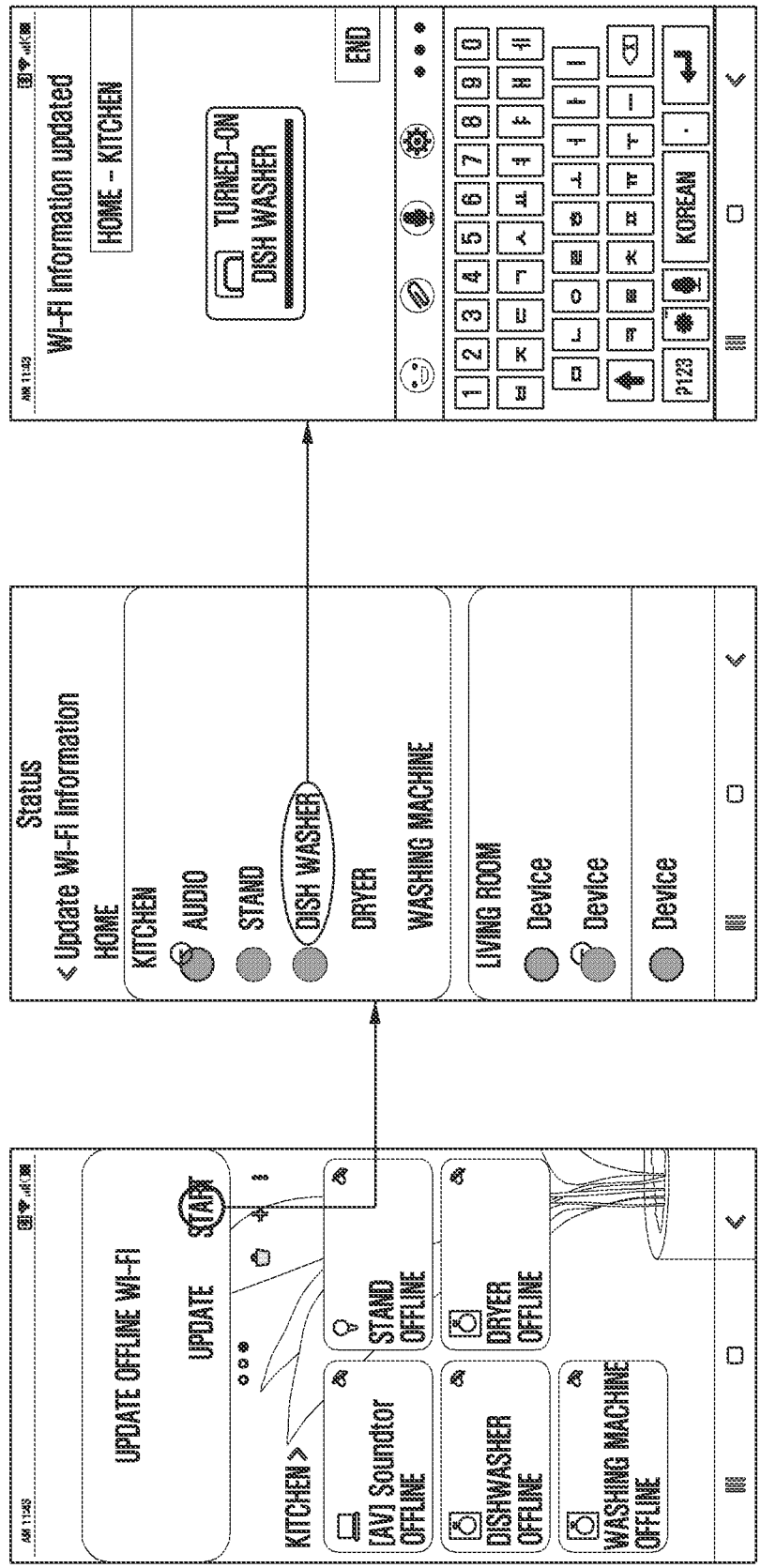
FIGS. 8A and 8B are diagrams illustrating examples of an alarm related to a changed network output by a processor according to various embodiments of the disclosure.
Figure 8B:
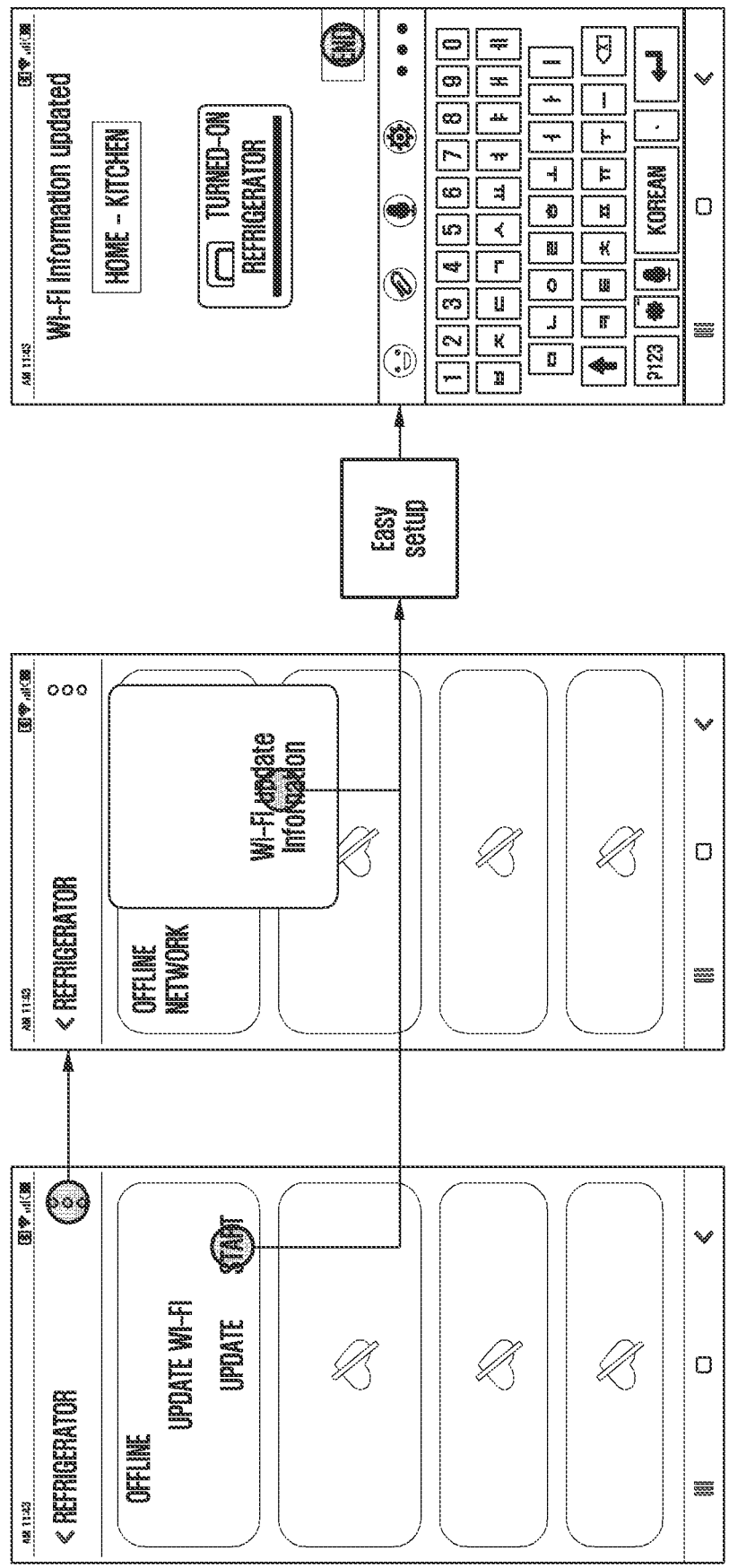

FIGS. 8A and 8B are diagrams illustrating examples of an alarm related to a changed network output by a processor 220 according to various embodiments of the disclosure.

Referring to FIG. 8A, it may be an example of an application screen related to control of the external electronic device 310.

According to an embodiment, an icon related to a registered external electronic device (e.g., audio/video (AV) stand, dishwasher, dryer and/or washing machine) may be displayed on the application screen related to the control of the external electronic device 310.

According to an embodiment, in response to determining that the external electronic device 310 is offline and the network to which the external electronic device 310 is connected has changed (e.g., operations 410 to 440 of FIG. 4), the processor 220 may output a UI (e.g., "Update offline Wi-Fi") related to the changed network.

According to an embodiment, in response to obtaining the user's network information update request input through the UI (user interface) according to the alarm related to the changed network (e.g., selecting "Start update"), the processor 220 may output a list of external electronic devices that are offline.

According to an embodiment, in response to obtaining an input for selecting one of the list of external electronic devices that are offline (e.g., selecting "Dishwasher"), the processor 220 may update information related to the changed network 320 to the external electronic device 310. For example, the external electronic device 310 may be connected to the server 330 by connecting to the changed network 320 (e.g., operations 560 to 570 of FIG. 5), based on the information related to the changed network 320.

Referring to FIG. 8B, it may be an example of an application screen related to control of the external electronic device 310.

According to an embodiment, an icon related to control of a registered external electronic device (e.g., a refrigerator) may be displayed on an application screen related to control of the external electronic device 310.

According to an embodiment, in response to determining that the external electronic device 310 (e.g., refrigerator) is offline and a network to which the external electronic device is connected has changed (e.g., operations 410 to 440 of FIG. 4), the processor 220 may output a UI related to the changed network (e.g., "offline", "start update").

According to an embodiment, in response to obtaining the user's network information update request input through the user interface (UI) according to the alarm related to the changed network (e.g., selecting "Start update" or selecting "Wi-Fi update" on the view-more screen), the processor 220 may update information related to the changed network 320 to the external electronic device 310. For example, the external electronic device 310 may be connected to the server 330 by connecting to the changed network 320, based on information related to the changed network 320 (e.g., operations 560 to 570 of FIG. 5).

The electronic device 200 according to various embodiment of the disclosure may include a communication module 290, a position sensor 276, and a processor 220. The processor is configured to obtain information of an external electronic device 310 including status information of the external electronic device 310, position information of the external electronic device 310, and network 320 information related to the external electronic device 310 from a server 330 through the communication module 290; check whether the external electronic device 310 is in an offline state, based on the information; check whether the electronic device 200 enters within a designated area at a position of the external electronic device 310, based on the position information of the electronic device 310 obtained from the position sensor 276, in response to the external electronic device 310 being in the offline state; scan a network 320 through the communication module 290 to check the network 320 information in response to the electronic device 200 being positioned in the designated area; and transmit the network 320 information to the external electronic device 310 in response to the network being different from the network 320 information related to the external electronic device 310.

In the electronic device 200 according to various embodiment of the disclosure, the processor 220 may output an alarm related to a network 320 change in response to the network 320 being different from the network 320 information related to the external electronic device 310.

In the electronic device 200 according to various embodiment of the disclosure, the processor 220 controls the external electronic device 310 to be connected to the network 320, based on the network 320 information transmitted to the external electronic device 310.

In the electronic device 200 according to various embodiment of the disclosure, the processor 220 controls the external electronic device 310 to register the external electronic device 310 with the server 330 through the network 320, based on the network 320 information transmitted to the external electronic device 310.

In the electronic device 200 according to various embodiment of the disclosure, before obtaining the information of the external electronic device 310 from the server 330, the processor 220 may be connected to an external electronic device 310 through the communication module 290, transmits the information related to a network 320 to the external electronic device 310, controls the external electronic device 310 to register the external electronic device 310 with a server 330 through the network 320, and transmits information related to the network 320 to the server 330.

In the electronic device 200 according to various embodiment of the disclosure, the processor 220 obtains information on the external electronic device 310 including a list of networks 320 connectable to the external electronic device 310 through the communication module 290, and transmits information related to at least one network 320 among the networks 320 connectable to the external electronic device 310 to the external electronic device 310.

A system according to various embodiments of the disclosure may include an external electronic device 310, an electronic device 200, a network 320, and a server 330. The electronic device 200 may receive a notification from the server 330 that the external electronic device 310 is in an offline state, scan the network 320 to obtain information related to the network 320, obtain information related to the external electronic device 310 by scanning the external electronic device 310, transmitting the information related to the network 320 to the external electronic device 310. The external electronic device 310 is connected to the network, based on the information related to the network 320, and connected to the server 330 through the network 320.

In the system according to various embodiments of the disclosure, the electronic device 200 may obtain position information of the external electronic device 310 from the server 330, check whether the electronic device 200 enters within a designated area at the position of the external electronic device 310, scan the network 320 to obtain information related to the network 320, in response to the electronic device 200 being positioned in the designated area.

In the system according to various embodiments of the disclosure, the electronic device 200 may obtain network 320 information related to the external electronic device 310 from the server 330, and transmit the network 320 information to the external electronic device 310 in response to the network 320 being different from the network 320 information related to the external electronic device 310.

In the system according to various embodiments of the disclosure, the external electronic device 310 may register the external electronic device 310 with the server 330 through the network 320.

An operation method of an electronic device 200 according to various embodiments of the disclosure may include an operation of obtaining information of the external electronic device 310 including status information of the external electronic device 310, position information of the external electronic device 310, and network 320 information related to the external electronic device 310 from a server 330 through the communication module 290, an operation of checking whether the external electronic device 310 is offline based on the information, an operation of checking whether the electronic device 200 enters within a designated area at the position of the external electronic device 310, based on the position information of the electronic device 200 obtained from the position sensor 276, in response to the external electronic device 310 being in the offline state, an operation of scanning a network 320 through the communication module 290 to check the network 320 information in response to the electronic device 200 being located in the designated area, and an operation of transmitting the network 320 information to the external electronic device 310 in response to the network 320 being different from the network 320 information related to the external electronic device 310.

The operation method of the electronic device 200 according to various embodiments of the disclosure may further include outputting an alarm related to a network 320 change in response to the network 320 being different from network 320 information related to the external electronic device 310.

The operation method of the electronic device 200 according to various embodiments of the disclosure may further include controlling the external electronic device 310 to connect to the network 320, based on the network 320 information transmitted to the external electronic device 310.

The operation method of the electronic device 200 according to various embodiments of the disclosure may further include controlling the external electronic device 310 to register the external electronic device 310 with the server 330 through the network 320 based on the network 320 information transmitted to the external electronic device 310.

The operation method of the electronic device 200 according to various embodiments of the disclosure may further include, before acquiring the information of the external electronic device 310 from the server 330, connecting to an external electronic device 310 through the communication module 290, transmitting information related to the network 320 to the external electronic device 310, controlling the external electronic device 310 to register the external electronic device 310 with a server through the network, and transmitting information related to the network 320 to the server 330.

The operation method of the electronic device 200 according to various embodiments of the disclosure may further include obtaining information on the external electronic device 310 including a list of networks 320 connectable to the external electronic device 310 through the communication module 290, and transmitting information related to at least one network 320 among networks 320 connectable to the external electronic device 310 to the external electronic device 310.

An operation method of a system according to various embodiments of the disclosure may include an operation of receiving, by an electronic device 200, a notification from a server 330 that an external electronic device 310 is in an offline state, an operation of scanning the network 320 to obtain information related to the network 320, an operation of scanning the external electronic device 310 to obtain information related to the external electronic device 310, an operation of transmitting information related to the network 320 to the external electronic device 310, an operation of connecting, by an external electronic device 310, to the network 320, based on the information related to the network 320, and an operation of connecting, by the external electronic device 310, to the server 330 through the network 320.

The operation method of the system according to various embodiments of the disclosure may further include an operation of obtaining position information of the external electronic device 310 from the server 330, an operation of checking whether the electronic device 200 enters within a designated area at the position of the external electronic device 310, and an operation of scanning the network 320 to obtain information related to the network 320, in response to the electronic device 200 being located in the designated area.

The operation method of the system according to various embodiments of the disclosure may further include an operation of obtaining network 320 information related to an external electronic device 310 from the server 330, and an operation of transmitting the network 320 information to the external electronic device 310 in response to the network 320 being different from network 320 information related to the external electronic device 310.

The operation method of a system according to various embodiments of the disclosure may further include an operation of registering, by the external electronic device 310, the external electronic device 310 with the server 330 through the network 320.

The various embodiments of this document and the terms used therein are not intended to limit the technical features described in this document to specific embodiments, and should be understood to include various modifications, equivalents, or substitutions of the embodiments.

In connection with the description of the drawings, like reference numerals may be used for similar or related components. The singular form of the noun corresponding to the item may include one or more of the item, unless the relevant context clearly dictates otherwise.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Where, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
communication circuitry;
memory storing one or more computer programs; and
one or more processors communicatively coupled to the communication circuitry and the memory,
wherein the one or more computer programs include computer-executable instructions that, when executed by the one or more processors individually or collectively, cause the electronic device to:
obtain, from a server through the communication circuitry, information of an external electronic device including status information of the external electronic device and network information related to the external electronic device, the information of the external electronic device indicating that the external electronic device is in an offline state,
based on identifying that the external electronic device is in the offline state, determine whether the electronic device is located within an area where the external electronic device is located,
based on determining that the electronic device is located in the area, perform a network scan to identify at least one connectable network in the area, and
based on identifying that the at least one connectable network does not include the network information related to the external electronic device, transmit network information of the at least one connectable network to the external electronic device.

2. The electronic device of claim 1, wherein the one or more computer programs further include computer-executable instructions that, when executed by the one or more processors individually or collectively, cause the electronic device to:
in case that the at least one connectable network does not include the network information related to the external electronic device, output an alarm related to a network change.

3. The electronic device of claim 1, wherein the one or more computer programs further include computer-executable instructions that, when executed by the one or more processors individually or collectively, cause the electronic device to:
before the obtaining of the information of the external electronic device from the server:
connect to the external electronic device through the communication circuitry;
transmit information related to a network to the external electronic device; and
transmit the information related to the network to the server.

4. The electronic device of claim 3, wherein the one or more computer programs further include computer-executable instructions that, when executed by the one or more processors individually or collectively, cause the electronic device to:

obtain information on the external electronic device including a list of networks connectable to the external electronic device through the communication circuitry, and transmit, to the external electronic device, information related to at least one network among the networks connectable to the external electronic device.

5. A method performed by an electronic device, the method comprising:

obtaining, by the electronic device from a server through communication circuitry, information of an external electronic device including status information of the external electronic device and network information related to the external electronic device, the information of the external electronic device indicating that the external electronic device is in an offline state;

based on identifying that the external electronic device is in the offline state based on the status information of the external electronic device, determining, by the electronic device, whether the electronic device is located within an area where the external electronic device is located;

based on determining that the electronic device is located in the area, performing, by the electronic device, a network scan to identify at least one connectable network in the area; and based on identifying that the at least one connectable network does not include the network information related to the external electronic device, transmitting, by the electronic device to the external electronic device, network information of the at least one connectable network.

6. The method of claim 5, further comprising:

based on the at least one connectable network not including the network information related to the external electronic device, outputting, by the electronic device, an alarm related to a network change.

7. The method of claim 5, further comprising:

before the obtaining of the information of the external electronic device from the server:

connecting, by the electronic device, to an external electronic device through the communication circuitry;

transmitting, by the electronic device to the external electronic device, network-related information; and transmitting, by the electronic device to the server, the network-related information.

8. The method of claim 7, further comprising:

obtaining, by the electronic device, information on the external electronic device including a list of networks connectable to the external electronic device through the communication circuitry; and transmitting, by the electronic device to the external electronic device, information related to at least one network among networks connectable to the external electronic device.

9. The method of claim 5, further comprising:

based on the at least one connectable network including the network information related to the external electronic device, outputting, by the electronic device, an alarm indicating that a problem has occurred in the external electronic device.

10. The electronic device of claim 1, wherein the one or more computer programs further include computer-executable instructions that, when executed by the one or more processors individually or collectively, cause the electronic device to:

in case that the at least one connectable network includes the network information related to the external electronic device, output an alarm indicating that a problem has occurred in the external electronic device.

11. The electronic device of claim 1, wherein the one or more computer programs further include computer-executable instructions that, when executed by the one or more processors individually or collectively, cause the electronic device to:

obtain, from the server, the information of the external electronic device through an application executed on the electronic device and related to controlling the external electronic device.

12. A non-transitory computer-readable storage medium for storing one or more computer programs comprising computer-executable instructions that, when individually or collectively executed by at least one processor of an electronic device, cause the electronic device to:

obtain, from a server, information of an external electronic device including status information of the external electronic device and network information related to the external electronic device, the information of the external electronic device indicating that the external electronic device is in an offline state;

based on identifying that the external electronic device is in the offline state based on the status information of the external electronic device, determine whether the electronic device is located within an area where the external electronic device is located;

based on determining that the electronic device is located in the area, perform a network scan to identify at least one connectable network; and based on identifying that the at least one connectable network does not include the network information related to the external electronic device, transmit, to the external electronic device, information related to the at least one connectable network.

13. The non-transitory computer-readable storage medium of claim 12, wherein the one or more computer programs further comprise computer-executable instructions that, when individually or collectively executed by the at least one processor of the electronic device, cause the electronic device to:

receive the information of the external electronic device from the server via an application executed on the electronic device.

14. The non-transitory computer-readable storage medium of claim 12, wherein the one or more computer programs further comprise computer-executable instructions that, when individually or collectively executed by the at least one processor, cause the electronic device to:

in case that the at least one connectable network does not include the network information related to the external electronic device, output an alarm related to a network change.

15. The non-transitory computer-readable storage medium of claim 12, wherein the one or more computer programs further comprise computer-executable instructions that, when individually or collectively executed by the at least one processor, cause the electronic device to:

before the obtaining of the information of the external electronic device from the server:

connect to the external electronic device;

transmit information related to a network to the external electronic device; and transmit the information related to the network to the server.

16. The non-transitory computer-readable storage medium of claim 15, wherein the one or more computer programs further comprise computer-executable instructions that, when individually or collectively executed by the at least one processor, cause the electronic device to:

obtain information on the external electronic device including a list of networks connectable to the external electronic device, and transmit, to the external electronic device, information related to at least one network among the networks connectable to the external electronic device.

17. The non-transitory computer-readable storage medium of claim 12, wherein the one or more computer programs further comprise computer-executable instructions that, when individually or collectively executed by the at least one processor, cause the electronic device to:

based on the at least one connectable network including network information related to the external electronic device, output an alarm indicating that a problem has occurred in the external electronic device.

* * * * *